Oct. 23, 1951 D. M. RUGGLES 2,572,667
METHOD OF PRODUCING QUARTZ CRYSTALS
Filed Dec. 30, 1948

INVENTOR
D. M. RUGGLES
BY
H. A. Burgess
ATTORNEY

Patented Oct. 23, 1951

2,572,667

UNITED STATES PATENT OFFICE 2,572,667

METHOD OF PRODUCING QUARTZ CRYSTALS

David M. Ruggles, Mount Tabor, N. J., assignor to Bell Telephone Laboratories, Incorporated, New York, N. Y., a corporation of New York Application December 30, 1948, Serial No. 68,265

2 Claims. (Cl. 175—183)

1

This invention relates to the processing of quartz crystals, and particularly to the detection of "twinning" at an early stage in production.

It is an object of the invention to determine the orientation of a crystal before it has been completely processed.

Quartz crystals are widely used to control the operating frequencies of vacuum tube circuits, to limit the frequencies to be transmitted through electric wave filters, and for many other purposes in which it is desirable to make use of their property of discriminating sharply between different frequencies of mechanical vibration or electrical oscillation.

The supply of natural quartz is limited, and the expense of producing the crystals is substantial. One factor contributing heavily to this expense is the wastage due to "twinning," a peculiarity in the formation of the crystals which is difficult to detect early in the manufacturing process. Quartz crystals may form in either of two ways, the relation between which is commonly described by saying that one of the crystals is formed in the positive, or "right-hand sense," and the other is formed in the negative, or "left-hand sense." When both senses are found in the same piece of crystal, it is said to be "twinned." In order to obtain certain characteristics, crystal plates are cut in particular relations to the crystalline axes. If plates are so cut in relation to the supposed axes, but it happens that the crystal is actually of the opposite sense, the plate will have entirely different and unpredictable characteristics, and in many cases will be completely useless. If regions of opposite sense are found in the same wafer, it is unusable for similar reasons.

In the previously known methods of crystal production, it had been impossible to detect with proper accuracy when the plate was cut in the wrong sense or when twinning was present in a particular piece until the manufacturing process had proceeded to a point where the crystal wafer was practically completed. The wafer, cut to size and polished, was then etched in acid and placed in an instrument known as the twinoriascope. The reflection of light from the wafer surface in this instrument gave a reliable indication as to whether it had been prepared from a blank in which the sense was uniform throughout. This method should still be used in conjunction with the present process,

2 which is not adapted to ready detection of small areas of twinning. The twinoriascope does not, however, function satisfactorily in those cases in which the sense throughout the entire wafer is opposite to that for which the angle of cut relative to the crystal axes had been calculated. This is due to the fact that in such a case there is no border line between regions of proper and improper sense, along which a difference in luster might be observed in the etch pattern. The defect would not then be discovered until frequency tests were made during the final stages of production, when the incorrectly sensed crystals would be found not to oscillate properly. Another factor interfering with the success of such tests was the presence of shallow surface twinning produced by the cutting operations with diamond saws. This required an additional and expensive finishing operation before the blanks were etched for testing with the twinoriascope.

In production, it was found that about 20 per cent of the blanks which had been almost completely processed had to be discarded finally as of the wrong sense due to undiscovered twinning, and were then useless for other purposes. It is obvious that this resulted in a very undesirable waste in time and money, as well as in the valuable raw material which might have been used for other cuts, had the twinning been detected at an earlier stage in the manufacture.

The present invention detects an incorrect sense of cut during a preliminary stage of production, while the quartz is in slab form. It eliminates the expense and time of performing finishing operations on plates of the wrong sense, and may permit re-cutting the slab for use in its correct sense. It is also useful as a production aid in identifying and sorting blanks of different senses.

The method operates to select crystals of the proper sense through an electrical and mechanical determination of a characteristic, the thickness shear frequency constant, which is related to the angle and sense of cut of the crystal.

The slab to be tested is placed on an anvil, which is connected to one of the input terminals of a frequency-indicating device adjusted to a certain value. A superheterodyne radio receiver calibrated in kilocycles is suitable for this purpose. A probe, connected to the other input terminal of the receiver, is then rubbed over the surface of the crystal to produce a piezoelectric response. The receiver is tuned over a narrow range near the proper frequency. If a scratchy noise is heard in the output, the slab is of the proper sense. If no noise is heard near that frequency, the slab is of the wrong sense, and is discarded or returned for re-cutting. If noise is heard at a widely different frequency, the wafer may be identified as being of a different orientation.

The invention may be better understood by reference to the drawings, in which.

It is to be understood that the embodiments shown are illustrative only of the invention, and that other modifications may be made within the scope of the appended claims.

The theoretical basis for the method may first be understood from the following considerations. Assume a crystal cut perpendicular to the mechanical or Y-axis, and in which the lateral dimensions are large compared with the thickness. If pressure is applied normal to the parallel faces, vibration will occur in the thickness shear mode, with the direction of motion perpendicular to the thickness, and electrical potentials will be correspondingly produced. The frequency of vibration $f$ may be shown to be $$f = \frac{1}{2t}\sqrt{\frac{c}{\rho}} \qquad (1)$$

where $t$ is the thickness of the plate, $c$ is the shear stiffness constant, and $\rho$ is the density constant. This reduces to the form $$f = \frac{K}{t} \qquad (2)$$

where $K$ is the thickness shear frequency constant.

If the crystal is cut in a plane rotated from the normal to the Y-axis, the coupling between the internal strains, of which $c$ in Equation 1 is a measure, varies with the angle, as described in a paper entitled "Some improvements in quartz crystal circuit elements" by F. R. Lack, G. W. Willard and I. E. Fair, page 453, et seq., Bell System Technical Journal, July 1934. Hence the value of $K$ in Equation 2 will vary with the orientation. This relation is shown graphically in Fig. 4 of the drawings.

To select slabs of the proper sense from a group cut to a certain orientation, the thickness is measured and substituted for $t$, with the proper $K$ value for the given orientation, in Equation 2 to find the frequency at which finished slabs should oscillate.

The actual frequency is checked by feeding the output of the crystal into the calibrated receiver, where its oscillations appear as a scratchy noise. If oscillations are not found near the proper frequency, the crystal is of the wrong sense.

Figure 4:
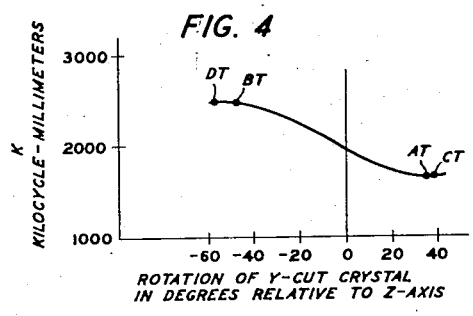
Fig. 4 is a graph showing the relation between the frequency constant and the orientation of a crystal.

As an example, assume that a group of crystal slabs has been cut for use as AT plates, that is, with a positive orientation of 35° 15′. The K value for this orientation, as seen at AT in Fig. 4, is 1680, where frequency is measured in kilocycles and thickness in millimeters. If a particular wafer is 1.00 millimeter thick, it would be expected, by Equation 2, to oscillate at a frequency of $$f = \frac{1680}{1.00} = 1680 \text{ kilocycles}$$

If it did not oscillate near this frequency, it would be of the wrong sense, and should be discarded.

In certain cases, when the cut is thus shown to be of the wrong sense, the plate may be re-cut. For example, a plate cut to be a CT, at +38°, could, if its sense proved incorrect, be re-cut for use as a BT plate at −47°.

As another example, assume the method is being used to separate plates of positive sense from those of negative sense, the exact angle of cut being unknown as well. If the thickness is 1.00 millimeter, as in the example above, those plates which oscillate at 1600 kilocycles to 1800 kilocycles would be immediately identified as of positive sense, and those oscillating at 2200 kilocycles to 2600 kilocycles as being of negative sense. It would still be necessary, however, to use the known X-ray techniques to separate those cuts of the same sense which have only a small angular difference in orientation, such as the AT and CT, which differ by approximately 2° 20′, and the DT and BT, which have a similarly small angular difference in orientation and K value, as may be seen from Fig. 4.

Figure 1:
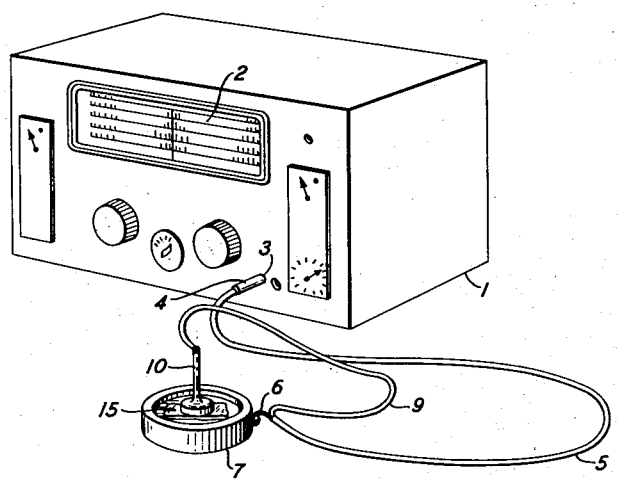
Fig. 1 illustrates apparatus for practicing the invention.

Referring now to Fig. 1 of the drawings, a frequency-indicating device 1 is shown. This device may be a superheterodyne receiver of conventional design provided with a tuning scale 2 calibrated in kilocycles. Other types of receivers may be used, but the superheterodyne is satisfactory because it may be accurately calibrated, and held to frequency within reasonable limits. The receiver should cover the frequencies to be anticipated of all cuts of crystals, both positive and negative, within the range of thicknesses to be tested. It will be obvious that in some cases it might be desirable to calibrate the frequency-indicating device directly in values of K or in the angles of orientation.

A jack 3 is provided which affords internal connection to the receiver input, or antenna and ground terminals. A plug 4 is arranged for insertion into jack 3, and has associated with it a two-conductor cord 5. One conductor 6 joins the antenna connection in receiver 1 to the anvil 7. The other conductor 9 joins the ground connection in the receiver 1 to the probe 10.

Figure 2:
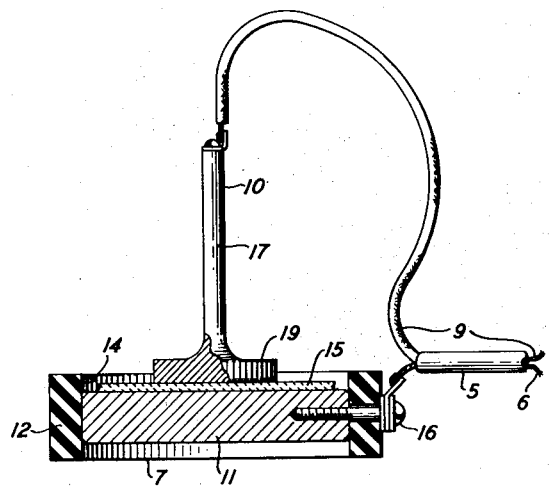
Fig. 2 is a side view, partially in section, of a portion of the equipment for carrying out the method of the invention.

Anvil 7 consists, as shown in detail in Fig. 2, of a flat-topped block 11 of conducting material such as cast iron supported by a rim 12 formed of material such as hard fiber or a phenolic condensation product of the type known commercially as "Bakelite." Rim 12 insulates the block 11 from any surface on which the anvil is placed. Its upper portion 14 extends above the block 11 to form therewith a convenient receptacle for a crystal slab or wafer 15 to be tested.

Electrical contact with the anvil 7, and thus with one side of the piezoelectric crystal 15, is obtained by connecting lead 6 to a bolt 16, which extends through insulating rim 12 and into the flat-top block 11.

Electrical contact with the opposite side of crystal 15 is obtained through lead 9 and probe 10, the latter having a manipulating handle 17, and a planar contact head 19. Substantially uniform pressure over a wide area of the crystal 15 may be applied through contact head 19, by pressure on handle 17, to induce a piezoelectric response. The probe 10 is formed of any good conducting material, cast iron being preferred.

Figure 3:
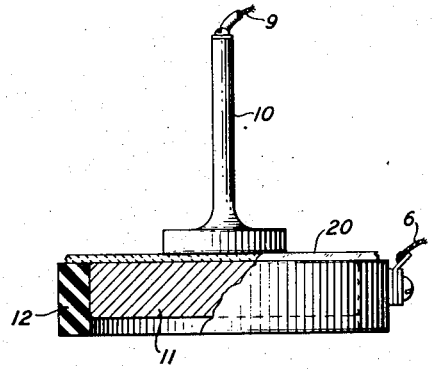
Fig. 3 is a similar view of a modified form of a portion of the equipment of Fig. 2.

In case the method is to be used in the factory to test large slabs, the anvil 7 of Fig. 2 may be modified as shown in Fig. 3. Rim 12 may be cut down even with the upper surface of block 11, and the slab 20 allowed to extend beyond the lateral limits of the block.

In operation, after the thickness of the wafer is measured by a micrometer or other suitable instrument, the radio frequency amplitude control is turned as high as practical, the wafer 15 is placed on the block 11, and the probe 10 is rubbed back and forth over the surface of the wafer. While the probe is being rubbed over the wafer, the receiver is tuned through the proper frequency range for the measured thickness, as around 1680 kilocycles in the first example above, to check the sense of plates intended for an AT cut. Or, if being used to separate negative cuts from positive cuts, as in the second example above, the receiver would be tuned through the range from 1600 kilocycles to 1800 kilocycles to pick out the positive wafers, and the remainder checked at 2200 kilocycles to 2600 kilocycles for the negative wafers. If oscillations occur in both ranges, regions of both senses are present, and the crystal should be discarded. If the scratchy noise indicative of oscillation is not heard at the appropriate frequency, the crystal is discarded, or else returned for re-cutting in a proper orientation. If the receiver sensitivity is insufficient, so that the oscillations are not readily heard at the proper frequency, a small quantity of number 400 Carborundum sprinkled on the electrodes will improve the results.

If the receiver is sufficiently sensitive, the ground connection through the probe 10 may not be needed. In such case the wafer may be moved about on the block 11 by the operator with his finger, and his body capacity to ground will be sufficient to complete the circuit.

From the above description it may be seen the invention presents a method of readily selecting and identifying crystals of different senses. While particular emphasis has been placed in the description on its use with simply rotated Y-cut quartz crystals, the same principles are applicable, as will be apparent to those skilled in the art, to use with crystals of more complex orientations. It may be used not only with quartz, but with any piezoelectric crystalline material after the K values characteristic of different orientations have been determined. The method requires only simple and readily constructed apparatus, and yet its use affords substantial savings in raw material and in time and cost of manufacture.

What is claimed is:

1. The method of determining the presence of twinning in crystal wafers prior to their being cut into crystal blanks which comprises rubbing a probe electrode successively over portions of one major surface of the crystal to produce localized piezoelectric oscillations in the crystal surface directly beneath the probe electrode, said electrode being of smaller area than said surface, and comparing the frequencies of said oscillations to ascertain the presence of frequency inconsistencies over the surface of the crystal indicative of twinning.

2. The method of determining the extent of twinning in rough crystal wafers of known thickness after they have been cut from the mother quartz and prior to their being cut into crystal blanks which comprises placing a crystal plate on an anvil electrode, rubbing a probe electrode over one portion of one major surface of the crystal plate to produce localized piezoelectric oscillations in the crystal surface directly beneath the probe electrode, said probe electrode being of smaller area than said surface, measuring the frequency of such oscillations, rubbing the probe electrode over other portions of the surface of the crystal to produce localized piezoelectric oscillations in those portions of the crystal surface, measuring the frequencies of such oscillations, and comparing said frequencies to determine the presence or absence of twinning.

DAVID M. RUGGLES.

REFERENCES CITED

The following references are of record in the file of this patent:

UNITED STATES PATENTS

| Number | Name | Date |
| --- | --- | --- |
| 2,400,895 | Wachtman | May 28, 1946 |
| 2,440,886 | Bach | May 4, 1948 |

OTHER REFERENCES

Radio News, May 1945, pages 46, 47, 160, 161.